United States Patent [19]

Takayama et al.

[11] Patent Number: 4,595,665
[45] Date of Patent: Jun. 17, 1986

[54] HIGH ALUMINA SINTERED BODY

[75] Inventors: Hiroshi Takayama; Hiroshi Maruyama, both of Kokubu, Japan

[73] Assignee: Kyocera Corporation, Japan

[21] Appl. No.: 668,652

[22] Filed: Nov. 6, 1984

[30] Foreign Application Priority Data

Nov. 7, 1983 [JP] Japan ................................. 58-209353

[51] Int. Cl.$^4$ ..................... C04B 35/18; C03C 10/04; B32B 9/04
[52] U.S. Cl. .................................... 501/128; 501/127; 501/5; 428/332; 428/699; 428/701
[58] Field of Search ....................... 428/332, 699, 701; 501/5, 127, 128

[56] References Cited

U.S. PATENT DOCUMENTS 3,808,013  4/1974  Manigault ............................ 501/128
3,879,210  4/1975  LaBar .................................. 501/128
4,272,500  6/1981  Eggerding et al. ...................... 501/5

FOREIGN PATENT DOCUMENTS 0073665  6/1981  Japan .

Primary Examiner—William R. Dixon, Jr.
Assistant Examiner—Karl Group
Attorney, Agent, or Firm—Spensley Horn Jubas & Lubitz

[57] ABSTRACT

A high alumina sintered body composed of a substrate consisting substantially of α-$Al_2O_3$ and a surface layer of mullite precipitated in situ on the substrate. The sintered body is obtained by molding and sintering a composition comprising a main component containing at least 75% by weight, based on the total weight of the composition, of α-$Al_2O_3$ and a predetermined amount of silica, a mullite mineralyzing agent and $B_2O_3$. The sintered body has a combination of excellent thermal shock resistance and mechanical properties such as flexural strength.

12 Claims, 3 Drawing Figures

FIG. 1-A
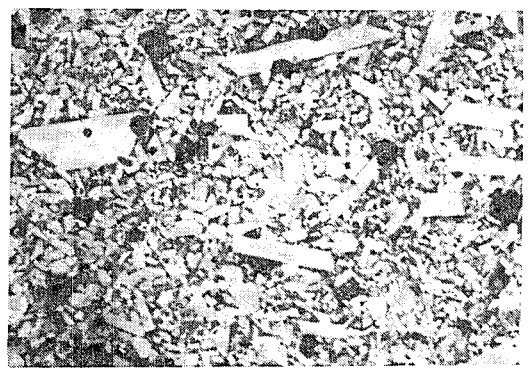
x 400
FIG. 1-B
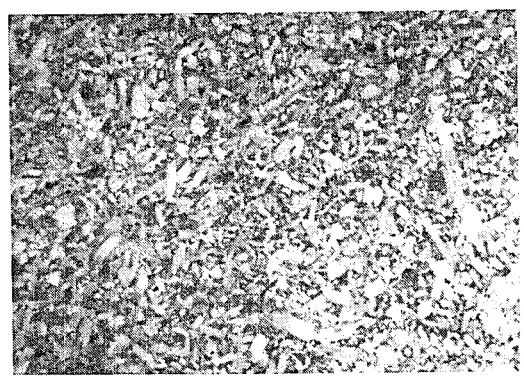
x 400

HIGH ALUMINA SINTERED BODY

BACKGROUND OF THE INVENTION

1. Field of the Invention

This invention relates to a sintered body having a high alumina content, and more specifically, to a high alumina sintered body having excellent thermal shock resistance and flexural strength.

2. Description of the Prior Art

High alumina ceramics containing at least 75% of $Al_2O_3$ (to be referred to as high alumina ceramics) have heretofore found wide applications in electronic component parts, industrial machine parts, etc. because of their excellent electrical insulation, heat resistance and mechanical properties.

It is known however that high alumina ceramics of this type have relatively high coefficients of thermal expansion among ceramics which are at least $70 \times 10^{-7}/°$ C., and cracks occur when the thermal shock temperature difference in rapid cooling in water is 200° C., and thus they have poor thermal shock resistance characteristics.

To improve thermal shock resistance, there have been used means for inhibiting the occurrence of thermal shock cracks by using materials having a low coefficient of thermal expansion such as aluminum titanate and cordierite, or rendering the sintered body porous. In such cases, however, the sintered bodies have a very low mechanical strength represented by a flexural strength of not more than 15 kg/mm².

Recently, Japanese Laid-Open Patent Publication No. 73665/1981 disclosed a low expansion high strength ceramic composition composed of mullite particles, alumina particles and a matrix of a $B_2O_3$-containing glass phase filling the interstices among these particles. Although this ceramic composition has a low coefficient of linear expansion as compared with conventional high alumina ceramics, it has a flexural strength of as low as 30 kg/mm², and its mechanical strength is still unsatisfactory.

SUMMARY OF THE INVENTION

It is an object of this invention therefore to provide a high alumina sintered body having excellent thermal shock resistance without a reduction in its high strength.

Another object of this invention is to provide a high alumina sintered body composed of a substrate of $\alpha$-alumina and a layer of precipitated mullite formed in situ on the surface of the substrate.

According to this invention, there is provided a high alumina sintered body composed of a substrate consisting substantially of $\alpha$-$Al_2O_3$ and a surface layer of mullite precipitated in situ on the substrate, said sintered body being obtained by molding and sintering a composition comprising a main component containing at least 75% by weight, based on the total weight of the composition, of $\alpha$-$Al_2O_3$ and a predetermined amount of silica, a mullite mineralyzing agent and $B_2O_3$.

BRIEF DESCRIPTION OF THE DRAWINGS

FIG. 1-A is an electron micrograph (magnification 400X) showing the particle structure of the $\alpha$-$Al_2O_3$ substrate in the high alumina sintered body of the invention;

FIG. 1-B is an electron micrograph (magnification 400X) showing the particle structure of the mullite precipitated layer in the high alumina sintered body of this invention.

DETAILED DESCRIPTION OF PREFERRED EMBODIMENTS OF THE INVENTION

Figure 2:
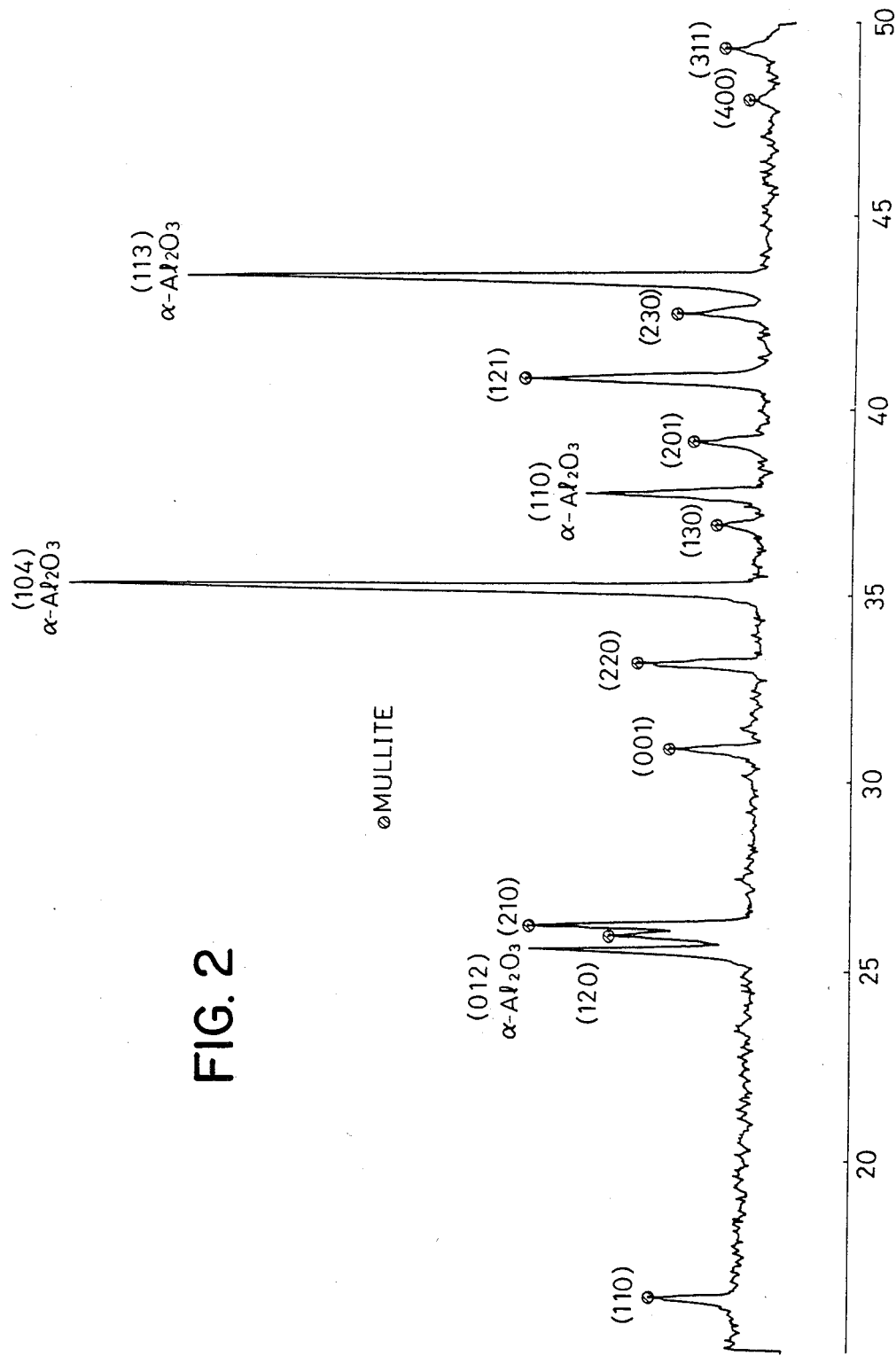
FIG. 2 is an X-ray diffraction pattern of the mullite precipitated layer in the sintered body of this invention.

The marked characteristic of the high alumina sintered body of this invention is that it has a structure composed of a substrate consisting substantially of $\alpha$-$Al_2O_3$ and a mullite precipitated surface layer formed on the substrate, and that the mullite precipitated layer is formed in situ by molding and sintering a composition to be described below.

As shown in the photographs of FIGS. 1-A and 1-B, the substrate consists of substantially spherical $\alpha$-$Al_2O_3$, and acicular or pillar-like mullite particles precipitated in the surface layer. In FIG. 1-B, mullite ($3Al_2O_3 \cdot 2SiO_2$) is observed as gray particles, and alumina, as white particles. The mullite precipitated surface layer may consist substantially of mullite particles, or mullite particles and $\alpha$-$Al_2O_3$ particles may be present as a mixture in a mosaic pattern. Generally, a glass phase, particularly one containing $SiO_2$, $Al_2O_3$, $TiO_2$, $ZrO_2$, MgO, CaO and $B_2O_3$ as components, generally exists among the $\alpha$-$Al_2O_3$ and mullite particles.

The mullite particles are composed mainly of particles of a material having the composition $3Al_2O_3 \cdot 2SiO_2$. Mullite has a coefficient of thermal expansion about half of that of alumina, and is expected to have high thermal shock resistance.

A high alumina ceramic composition contains several percent of $SiO_2$, but when the amount of $SiO_2$ is less than 5%, mullite is not formed usually. However, by adding $B_2O_3$, a marked mullite phase is formed on the surface. This is because $B_2O_3$ has the action of lowering the apparent activating energy of forming mullite. The presence of the mullite layer only on the surface layer is presumably because $B_2O_3$ has a high equilibrium vapor pressure and is readily volatilized and therefore, the mullite layer is liable to move to the surface layer. If the amount of $B_2O_3$ is too large, the melting point of the vitreous material is lowered excessively and it becomes unstable. Even when $B_2O_3$ is present in a suitable amount, mullite is formed in a thickness smaller than $100\mu$ in the surface layer and its precipitation is unstable. Accordingly, variations may readily occur in regard to the thermal shock resistance of the sintered product. When $TiO_2$, $ZrO_2$, etc. which are mineralyzing agents for mullite are added, a mullite layer having a thickness of at least $100\mu$ is formed in the surface layer and high thermal shock resistance is obtained stably. The temperature difference $\Delta T$ in rapid cooling in water is at least 200° C. This is presumably because mullite having a lower coefficient of expansion is present in a large amount in the surface layer portion which is most susceptible to thermal stress, and the entire surface layer portion gains a low coefficient of thermal expansion. It has also been found that since mullite is precipitated selectively in the surface layer portion, a compression stress acts on the surface layer, and a flexural strength of at least 36 kg/mm² can be obtained.

It is important that in the mullite surface precipitated layer of the sintered body of this invention, mullite is precipitated such that the peak ratio ($R_f$) defined by the following equation $$R_I = (I_M/I_A) \times 100$$

wherein $I_M$ represents the peak intensity of the plane index (210) of mullite in the X-ray diffraction of the mullite precipitated surface layer and $I_A$ represents the peak intensity of the plane index (012) of α-Al$_2$O$_3$ in the X-ray diffraction of the mullite precipitated surface layer, becomes at least 30%. If the peak ratio ($R_I$) is lower than 30%, the flexural strength and thermal shock resistance are much lower than those of the sintered body of the invention. A trace of mullite may sometimes be present in the substrate of the sintered body of the invention in addition to α-Al$_2$O$_3$. The amount of mullite present in the substrate, however, is such that the presence of mullite is not observed by X-ray diffraction of the substrate.

FIG. 2 is an X-ray diffraction pattern of the surface of the sintered body of this invention from which it is seen that X-ray diffraction peaks inherent to mullite (2θ=26.0, 26.2) appear.

In the present invention, B$_2$O$_3$ is used in an amount of not more than 1% by weight, for example as in a composition comprising a main component containing 75 to 95% by weight of Al$_2$O$_3$ and 3 to 10% by weight of SiO$_2$ based on the entire composition, 1 to 10% by weight of a mullite mineralyzing agent such as TiO$_2$ and ZrO$_2$, 0.3 to 1% by weight of B$_2$O$_3$, and 0.4 to 3% by weight of at least one of MgO and CaO as a sintering aid. The sintered body is obtained by molding the composition of such a formulation and thereafter maintaining the molded product in an oxidizing atmosphere at a temperature in the range of 1400° to 1700° C. for about 3 hours.

If in the above high alumina composition, the amount of Al$_2$O$_3$ is less than 75% by weight, the strength of the sintered body is as low as not more than 35 kg/mm$^2$. If it exceeds 95% by weight, mullite does not precipitate and the shock resistance of the sintered body is not improved. If the amount of SiO$_2$ as a sintering aid is less than 3% by weight, mullite does not precipitate on the surface layer of the sintered body. If it exceeds 10% by weight, the flexural strength of sintered body is reduced. If the amount of MgO and CaO as a sintering aid is less than 0.4% by weight, sintering becomes difficult. If it exceeds 3% by weight, the sintered body has reduced strength and thermal shock resistance.

If the amount of TiO$_2$ and ZrO$_2$ as a mullite mineralyzing agent is less than 1% by weight, precipitation of mullite on the surface layer of the sintered body is difficult. If it exceeds 10% by weight, pores increase and the flexural strength of the sintered body is reduced.

If the amount of B$_2$O$_3$ is less than 0.3% by weight, the effect of mullite precipitation is small, and if it exceeds 1% by weight, both the heat resistance and strength of the sintered body are reduced.

Preferably, the ratio of SiO$_2$ to the mullite mineralyzing agent such as TiO$_2$ and ZrO$_2$ is at least 1, and the ratio of SiO$_2$ to B$_2$O$_3$ is in the range of from 3 to 20.

If the ratio of SiO$_2$/the mullite mineralyzing agent is less than 1, the strength and thermal shock resistance of the sintered body are reduced. If the SiO$_2$/B$_2$O$_3$ ratio is less than 3, the stability of the glass matrix is impaired and the strength and thermal shock resistance of the sintered body are reduced. If the SiO$_2$/B$_2$O$_3$ ratio exceeds 20, the effect of selective precipitation of mullite on the surface is small, and the thermal shock resistance of the sintered body is not improved.

The invention is further illustrated by the following Example.

EXAMPLE

In each run, α-Al$_2$O$_3$ having an average particle diameter of 2 μm, silica rock having an average particle diameter of 2 to 3 μm, CaCO$_3$ having an average particle diameter of 1 to 2 μm, Mg(OH)$_2$, H$_3$BO$_3$ and TiO$_2$ were mixed in accordance with the formulations shown in Table 1 and pulverized in the wet state in the presence of water in an alumina pot with alumina balls to adjust the average particle diameter of the mixture to about 1.5 μm. Polyethylene glycol as an organic binder was added in an amount of 5% to the resulting slurry, and the mixture was spray-dried and then passed through a 100-mesh sieve to form a starting material. The material was compression-molded under a pressure of 1000 kg/cm$^2$ and calcined for 3 hours at a maximum temperature of 1450° to 1650° C. to form a sample having a size of 4×5×38 mm.

The resulting sintered body sample was tested for the amount (%) of precipitated mullite determined by the peak ratio of the peak intensity of (210) plane of mullite to the peak intensity of (012) plane of α-Al$_2$O$_3$ in the X-ray diffraction of the surface of the sintered body, the thickness (μm) of the mullite layer in the surface layer of the sintered body determined by surface polishing, flexural strength (kg/mm$^2$), the thermal shock temperature difference (°C.) by rapid cooling in water and specific gravity as a measure of the compactness of the sintered body. The results obtained and the calcination temperatures used are summarized in Table 1 below.

TABLE 1

| Sample No. | 1 x | 2 x | 3 x | 4 x | 5 x | 6 x | 7 x | 8 | 9 | 10 |
|---|---|---|---|---|---|---|---|---|---|---|
| Al$_2$O$_3$ (wt. %) | 95 | 86.5 | 93.7 | 90.5 | 94.0 | 93.75 | 94.0 | 94.0 | 94.0 | 91.0 |
| SiO$_2$ (wt. %) | 2.5 | 11 | 4.5 | 4.5 | 4.0 | 4.0 | 4.0 | 4.0 | 3.0 | 5.0 |
| MgO (wt. %) | 0.5 | 1.0 | 0.3 | 3.5 | 1.0 | 0.5 | 0.5 | 0.2 | 0.2 | 0.5 |
| CaO (wt. %) | 0.5 | 1.0 | 0.3 | 3.5 | 1.0 | 0.5 | 0.5 | 0.3 | 0.3 | 0.5 |
| TiO$_2$ (wt. %) | 1.0 | 1.0 | 1.0 | 1.0 | — | 1.0 | 0.5 | 1.0 | 2.0 | 2.5 |
| ZrO$_2$ (wt. %) | — | — | — | — | — | — | — | — | — | — |
| B$_2$O$_3$ (wt. %) | 0.5 | 0.5 | 0.5 | 0.5 | — | 0.25 | 0.5 | 0.5 | 0.5 | 0.5 |
| Sinterability | — | — | Δ | | | | | | | |
| Amount of mullite precipitated (%)* | — | 90 | 40 | 40 | — | 20 | 10 or less | 80 | 70 | 90 |
| Thickness (μm) of the mullite layer | — | 300 | 100 | 100 | — | below 100 | below 100 | at least 200 | at least 200 | at least 200 |
| Flexural strength (kg/mm$^2$) | 35 | 30 | 30 | 30 | 35 | 35 | 35 | 52 | 48 | 45 |
| Thermal shock temperature difference | 190 | 190 | 190 | 190 | 190 | 190 | 190 | 260 | 250 | 270 |

TABLE 1-continued

| | | | | | | | | | | |
|---|---|---|---|---|---|---|---|---|---|---|
| (°C.) | | | | | | | | | | |
| Specific gravity | 3.7 | 3.4 | 3.5 | 3.6 | 3.7 | 3.7 | 3.7 | 3.7 | 3.7 | 3.6 |
| Sintering temperature | 1600 | 1500 | 1650 | 1500 | 1600 | 1550 | 1550 | 1600 | 1500 | 1500 |

| Sample No. | 11 | 12 | 13 | 14 | 15 | 16 | 17 x | 18 x | 19 x |
|---|---|---|---|---|---|---|---|---|---|
| $Al_2O_3$ (wt. %) | 84.5 | 81.5 | 76.5 | 94.0 | 93.0 | 93.0 | 81.0 | 89.5 | 94.0 |
| $SiO_2$ (wt. %) | 10.0 | 10.0 | 10.0 | 4.0 | 4.0 | 4.5 | 5.0 | 5.0 | 4.0 |
| MgO (wt. %) | 2.0 | 2.0 | 2.0 | 0.2 | — | 0.2 | 1.0 | 1.0 | — |
| CaO (wt. %) | 1.0 | 1.0 | 1.0 | 0.3 | 0.5 | 0.3 | 1.0 | 1.0 | — |
| $TiO_2$ (wt. %) | 2.0 | 5.0 | 10.0 | — | — | — | 11 | 1.0 | 1.0 |
| $ZrO_2$ (wt. %) | — | — | — | 1.0 | 1.5 | 1.5 | — | — | — |
| $B_2O_3$ (wt. %) | 0.5 | 0.5 | 0.5 | 0.5 | 1.0 | 0.5 | 1.0 | 2.5 | 1.0 |
| Sinterability | | | | | | | | | x |
| Amount of mullite precipitated (%)* | 90 | 150 | 200 | 30 | 40 | 30 | 70 | 50 | 40 |
| Thickness (μm) of the mullite layer | at least 300 | at least 300 | at least 300 | 100 | 100 | 100 | at least 300 | at least 200 | at least 100 |
| Flexural strength (kg/mm²) | 37 | 37 | 36 | 37 | 40 | 37 | 28 | 30 | 25 |
| Thermal shock temperature difference (°C.) | 230 | 230 | 230 | 240 | 240 | 240 | 180 | 180 | 180 |
| Specific gravity | 3.4 | 3.4 | 3.4 | 3.7 | 3.7 | 3.7 | 3.5 | 3.5 | 3.5 |
| Sintering temperature | 1450 | 1450 | 1450 | 1650 | 1650 | 1650 | 1450 | 1450 | 1650 |

Note
The samples marked x are outside the scope of the invention.
The asterisked item shows the peak ratio of the peak intensity of the (210) plane of mullite to that of the (012) plane of α-$Al_2O_3$ by X-ray diffraction.

In sample Nos. 1 and 2, the amount of $SiO_2$ is outside the scope of this invention. When it is 2.5% by weight, mullite does not precipitate on the surface layer of the sintered body. When it is 11% by weight, the flexural strength is as low as 35 kg/mm². In sample Nos. 3, 4 and 19, the amounts of MgO and CaO as sintering aids are outside the scope of this invention. When the amount is 0.3% by weight, sintering is difficult. When it is 3.5% by weight, the flexural strength is as low as 30 kg/mm². When such a sintering aid is not added, the composition has poor sinterability. In sample Nos. 5, 7 and 17, the amount of $TiO_2$ is outside the scope of the invention. When $TiO_2$ is not added, mullite does not precipitate. When its amount is 0.5% by weight, the amount of mullite precipitated on the surface layer is as small as less than 10% and its precipitation is difficult. When its amount is 11% by weight, pores increase and the flexural strength is as low as 28 kg/mm². In sample Nos. 6 and 18, the amount of $B_2O_3$ is outside the scope of this invention. When it is 0.25% by weight, the amount of mullite precipitated is as low as 20%. When it is 2.5% by weight, the thermal shock temperature difference is as low as 180° C. and the flexural strength is as low as 30 kg/mm².

When the ratio of $SiO_2$ to the mullite mineralyzing agent such as $TiO_2$ or $ZrO_2$ is less than 1, both the flexural strength and thermal shock resistance of the sintered body are reduced. When the $SiO_2/B_2O_3$ ratio is less than 3, the stability of the glass matrix is impaired, and the flexural strength and thermal shock resistance of the sintered body are reduced. When the $SiO_2/B_2O_3$ ratio is more than 20, the effect of selective precipitation of mullite on the surface is small, and the thermal shock resistance of the sintered body is not improved.

In the above Example, $TiO_2$ and $ZrO_2$ were added as the mullite mineralyzing agent. It is also possible to select at least one of $Fe_2O_3$, $MnO_2$, $ZrO_2$, $MoO_2$ and $Ce_2O_3$ as the mullite mineralyzing agent.

Sample Nos. 8 to 16 shown in Table 1 are within the scope of this invention. In these samples, the peak ratio of the peak intensity of the (210) plane of mullite to the peak intensity of (012) plane of α-$Al_2O_3$ in X-ray diffraction is at least 30%. In particular, in sample No. 13, the peak ratio is as high as 200% indicating the precipitation of a large amount of mullite, and the thickness of the mullite layer is at least 100 μm. In sample Nos. 11, 12 and 13, the mullite surface layer is formed in a thickness of at least 300 μm. Since a compression stress acts on the surface layer portion of the sintered body as a result of formation of the mullite layer, the flexural strengths of these sintered bodies are 36 kg/mm² or higher in contrast to a flexural strength of about 30 kg/mm² in conventional high alumina ceramics, and sample No. 8 has a high flexural strength of 52 kg/mm². In the measurement of the thermal shock temperature difference by rapid cooling in water as thermal shock resistance characteristics, the temperature difference measured is 230° C. or higher in contrast to 200° C. or lower in conventional high alumina ceramics. In particular, sample Nos. 8, 9 and 10 show a very high temperature difference of 250° to 270° C. indicating best thermal shock strength.

The coefficient of thermal expansion of these samples are within the range of 64.0 to 77.5×10⁻⁷/° C. at a temperature of 40° to 400° C. which is the same as in conventional high alumina ceramics. Since the specific gravity is 3.4 to 3.7, the sintered bodies obtained in this invention are fully compact and dense.

What is claimed is:

1. A high alumina sintered body composed of a substrate consisting substantially of α-$Al_2O_3$ and a surface layer of mullite precipitated in situ on the substrate, wherein α-$Al_2O_3$ and a glass phase are present in the mullite surface layer, said sintered body being obtained by molding and sintering at a temperature at or above about 1400° C. a composition consisting essentially of 75 to 95% by weight of α-$Al_2O_3$ and 3 to 10% by weight of $SiO_2$ as main components, 1 to 10% by weight of a mullite mineralyzing agent selected from the group consisting of $TiO_2$, $ZrO_2$, $Fe_2O_3$, $MnO_2$, $MoO_2$, $Ce_2O_3$ and mixtures thereof 0.3 to 1% by weight of $B_2O_3$, and 0.4 to 3% by weight of at least one of MgO and CaO.

2. The sintered body of claim 1 wherein the precipitation of mullite is effected such that the peak ratio ($R_I$) defined by the following equation $$R_I = (I_M/I_A) \times 100$$

wherein $I_M$ represents the peak intensity of the plane index (210) of mullite in the X-ray diffraction of the mullite precipitated surface layer and $I_A$ represents the peak intensity of the plane index (012) of $\alpha\text{-}Al_2O_3$ in the X-ray diffraction of the mullite precipitated surface layer, becomes at least 30%.

3. The sintered body of claim 1 wherein its surface layer has the mullite precipitated layer having a thickness of at least 100 μm.

4. The sintered body of claim 1 which has a thermal shock temperature difference of at least 200° C.

5. The sintered body of claim 1 which has a flexural strength of at least 36 kg/mm².

6. The sintered body of claim 1 wherein the ratio of $SiO_2$ to the mullite mineralyzing agent is at least 1.

7. The sintered body of claim 1 wherein the ratio of $SiO_2$ to $B_2O_3$ is from 3 to 20.

8. A high alumina sintered body comprising a substrate consisting substantially of alpha alumina, the substrate having a surface layer including mullite, the surface layer mullite being precipitated in situ on the substrate surface, wherein the sintered body is produced by sintering at a temperature at or above 1400° C. a composition consisting essentially of:

from about 75 to about 95% by weight of alpha alumina;

from about 3 to about 10% by weight of silica;

from about 1 to about 10% by weight of a mullite mineralizing agent selected from the group consisting of $TiO_2$, $ZrO_2$, $Fe_2O_3$, $MnO_2$, $MoO_2$, and $Ce_2O_3$ and mixtures thereof from about 0.3 to 1% by weight of boron oxide; and from about 0.4 to 3% by weight of a sintering aid selected from the group comprising magnesium oxide and calcium oxide.

9. A high alumina sintered body according to claim 8 wherein the substrate surface layer consists substantially of mullite.

10. A high alumina sintered body according to claim 8 wherein the substrate surface layer consists substantially of mullite, alpha alumina and a glass phase containing silica, alumina, titanium dioxide, zirconium dioxide, magnesium oxide, calcium oxide, and boron oxide.

11. A high alumina sintered body according to claim 8 wherein there is present in the composition to be sintered greater than or equal to 5% by weight silica dioxide.

12. A high alumina sintered body according to claim 8 wherein the sintering is accomplished within an oxidizing atmosphere and wherein the sintering temperature is from about 1400° to about 1700° C.

* * * * *